United States Patent [19]

Goetsch et al.

[11] Patent Number: 4,877,550

[45] Date of Patent: Oct. 31, 1989

[54] SYNTHESIS GAS PREPARATION AND CATALYST THEREFOR

[75] Inventors: Duane A. Goetsch; Geoffrey R. Say, both of Baton Rouge, La.

[73] Assignee: Exxon Research and Engineering Company, Florham Park, N.J.

[21] Appl. No.: 294,854

[22] Filed: Jan. 9, 1989

Related U.S. Application Data

[63] Continuation-in-part of Ser. No. 174,173, Mar. 28, 1988, abandoned.

[51] Int. Cl.$^4$ .................................................. C01B 3/30
[52] U.S. Cl. ...................................................... 252/373
[58] Field of Search ........................................ 252/373

[56] References Cited

U.S. PATENT DOCUMENTS

| 3,119,667 | 1/1964 | McMahon | 252/373 |
| 3,232,726 | 2/1966 | Eagle et al. | 252/373 |
| 3,524,819 | 8/1970 | Guerrieri | 252/373 |

OTHER PUBLICATIONS

Yerushalmi et al, Chem Tech, Sep. 1978, pp. 564–572.

Primary Examiner—Howard T. Mars
Attorney, Agent, or Firm—Jay Simon

[57] ABSTRACT

Light hydrocarbons, e.g., methane are converted to synthesis gas at elevated temperatures and pressures in the presence of a particulate catalyst, e.g., Ni/Al$_2$O$_3$. The conversion of feed to synthesis gas is preserved by rapidly cooling the reaction production to a temperature below that which favors the back reaction of carbon monoxide and hydrogen to form methane.

10 Claims, 2 Drawing Sheets

SYNTHESIS GAS PREPARATION AND CATALYST THEREFOR

This application is a continuation-in-part of Ser. No. 174,173, filed Mar. 28, 1988 now abandoned.

FIELD OF THE INVENTION

This invention relates to the production and preservation of synthesis gas, carbon monoxide, and hydrogen, in a catalytic process wherein a light hydrocarbon feed, primarily methane, is converted in a first reaction zone and rapidly cooled in a second zone to preserve the synthesis gas formed and to reduce the amount of carbon deposited on equipment walls. The rapid cooling is affected by indirect means and steam is recovered from the cooling zone, at least a portion of which is utilized to preheat the light hydrocarbon feed.

BACKGROUND OF THE INVENTION

The steam reforming reaction for the production of synthesis gas is well known, viz.

$$CH_4 + H_2O \rightleftharpoons CO + 3H_2 \quad (1)$$

the reaction being endothermic, and occurring at elevated temperatures and pressures, e.g., above about 1500–1600° F. and 25–30 atmospheres, in the presence of a suitable catalyst usually supported nickel catalyst. Another method for producing synthesis gas is the non-catalytic partial oxidation reaction which is exothermic and illustrated as:

$$CH_4 + O_2 \rightarrow CO + H_2 + H_2O \quad (2)$$

These reactions have been combined in various prior references to produce synthesis gas by the reaction of a light hydrocarbon, e.g., methane, with steam and oxygen in the presence of a suitable catalyst in either fixed or fluid beds. The combined reaction is

$$CH_4 + 1/2 O_2 \rightarrow CO + 2H_2 \quad (3)$$

which results in a synthesis gas product that can be directly used in the synthesis of higher hydrocarbons via the Fischer-Tropsch process where the stoichiometric requirement for hydrogen to carbon monoxide is about 2/1.

Fluid bed processes are particularly useful in that excellent mixing is effected along with high heat transfer to prevent reaction runaway and hot spots. Fluid beds are, however, a mixed blessing in that the constant motion of the catalyst particles, against other particles and reactor walls, causes catalyst attrition and entrainment of fine catalyst particles, e.g., less than about 20 micron, in the overhead product gas, no matter the efficiency or number of catalyst recovery cyclones. These particles tend to deposit in equipment lines downstream of the fluid bed reactor where product gas cooling occurs and as the temperature decreases, these particles can promote the back reaction of carbon monoxide and hydrogen to re-form methane, resulting in serious product debits. Note that reaction (1) is reversible. In addition, as the product gas is cooled, there is a tendency for carbon to form as a result of the well known Boudouard reaction

$$2CO \rightarrow C + CO_2 \quad (4)$$

Carbon deposition in equipment leads to clogging of lines and premature process turnarounds to clear those lines.

An object of this invention is to provide a synthesis gas preparation process—including both the reaction and the cooling steps—that substantially preserves, as carbon monoxide and hydrogen, the hydrocarbon conversion to synthesis gas in the reaction zone. Another object is to prevent carbon deposition in equipment lines during the cooling step. These and other objects are accomplished by the practice of this invention.

Another object of this invention is to make efficient use of the heat recovered in the cooling zone and to save energy by using that heat, in the form of high pressure steam, to preheat the light hydrocarbon feed to the reaction zone.

In a reaction zone, a light hydrocarbon feed, primarily methane as in natural gas, is reacted with oxygen and steam in the presence of a supported nickel catalyst. The reaction zone is maintained at elevated temperatures and pressures and a reaction product comprising synthesis gas (carbon monoxide and hydrogen) and some entrained catalyst particles is produced. The conversion of the feed to synthesis gas, carbon monoxide and hydrogen, is maintained in the subsequent cooling zone by rapidly cooling the product gas from the reaction zone by indirect heat exchange to a temperature below which the back reaction of carbon monoxide and hydrogen to form methane is favored. The rapid cooling substantially prevents both the back reaction to form methane in the presence of entrained catalyst and the deposition of carbon in accordance with the Boudouard reaction. Rapid cooling through the use of indirect heat exchange, i.e., shell and tube exchange, generates steam, at least a portion of which is used to preheat the light hydrocarbon feed, thereby saving on the fuel required to heat the feed to reaction temperature.

The rapid cooling that is effected in the cooling zone takes the product from the temperature of the synthesis gas generation reaction in the reaction zone to a temperature below that which favors the back reaction of carbon monoxide and hydrogen to form methane in the presence of entrained catalyst. Thus, the product gas is cooled from temperatures in excess of about 1700° F. to a temperature below about 1200° F.; preferably below about 900° F. In this way, at least about 85% of the feed converted to synthesis gas is maintained as synthesis gas. Further increasing the rate of cooling serves to preserve somewhat more feed conversion as synthesis gas and substantially decreases the amount of carbon formed by the Boudouard reaction. (The net methane conversion is the total of methane and other light hydrocarbons converted to synthesis gas in the reaction zone less the amount of methane formed by the back reaction of carbon monoxide and hydrogen that is promoted by the catalyst carried over from the reaction zone into the cooling zone. The methane conversion preserved is the percent methane remaining after cooling relative to the total conversion of methane and other light hydrocarbons in the feed converted to synthesis gas.)

DETAILED DESCRIPTION OF THE INVENTION

Figure 1:
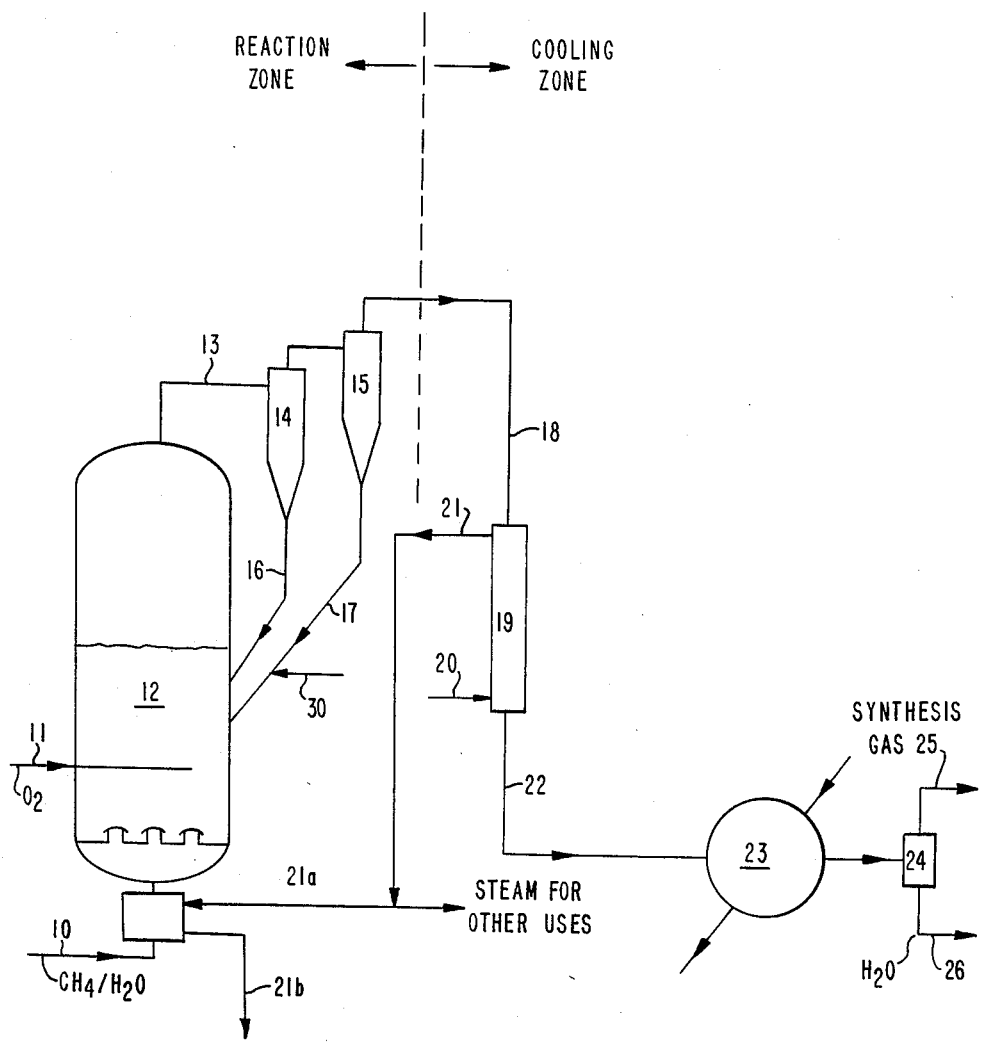
FIG. 1 is a schematic of a fluid bed synthesis gas generation process showing the reaction zone and the cooling zone.

The production of synthesis gas by this invention is carried out at conditions of elevated temperatures and pressures that favor the formation of hydrogen and carbon monoxide, synthesis gas, when, for example, methane is reacted with oxygen and steam. Temperatures are usually in excess of about 1700° F. but not so high as to cause disintegration of the catalyst or the sticking together of catalyst particles. Preferably, temperatures range from about 1750° F. to about 1950° F., more preferably about 1800° to 1850° F. Pressure may range from atmospheric to about 40 atmospheres. Where the ratio of hydrogen to carbon monoxide in the synthesis gas becomes important and where, for example, the synthesis gas will be used in a Fischer-Tropsch type process, intermediate pressures are preferred, that is, about 20–30 atmospheres, which allows the subsequent process to proceed without intermediate compression of product gases.

The steam reforming reaction can be carried out in either a fixed bed or fluid bed. Fluid beds have been used in processing applications where temperature control and heat transfer are important and in cases where low pressure drop is necessary. In a fluid bed reactor system, particulate catalysts are employed and when the product gases exit the reaction zone, some catalyst is entrained and is present during the cool down step in the cooling zone. As cooling occurs, steam reforming equilibrium shifts and causes carbon monoxide and hydrogen to react to re-form methane and in addition the Boudouard reaction equilibrium shifts in the direction to favor carbon formation.

Entrainment is an inherent problem in a fluid bed system where some catalyst particles escape from the bed with the product gases. The use of cyclones (primary or secondary), located within or outside the reaction zone does control the amount of catalyst carried overhead; but cyclones are not 100% efficient. In addition, particulate catalyst in a fluid bed tends to attrit, i.e., break into smaller particles which are <20 microns due to the constant circulation of the catalyst particles in the bed and due to the impingement of the particles on the walls of the cyclones. Current cyclone design cannot effectively capture such small particles, also known as fines. These fines or small particles tend to deposit on the internals of the downstream equipment, particularly equipment or lines where cooling is taking place. The presence of these small particles or fines, even in small amounts is sufficient to catalyze the back reaction of carbon monoxide and hydrogen to methane and can also catalyst the Boudouard reaction to form carbon. In this type of system, minimizing the residence time in the cooling equipment is particularly important in order to minimize the extent of these undesirable reactions.

Rapid cooling can be effected by either direct or indirect methods, that is, the product gas can be quenched, direct heat exchange, by the injection of water directly into the product gas in the cooling zone. This method requires large amounts of water, makes down stream separation more difficult, and produces no valuable result other than the cooling itself. On the other hand, indirect heat exchange, for example with a shell and tube exchanger, results in the generation of substantial amounts of high pressure steam that can be efficiently utilized to create energy both through exporting and through use in the synthesis gas generation step by preheating the feed.

In a preferred embodiment of this invention, synthesis gas is produced in a catalytic, fluidized bed reactor involving the reaction of methane, steam, and oxygen. The reactions that occur are shown as reactions (1) and (2) above, and which are summed by reaction (3) above. The combined process shown by equation (3) produces synthesis gas wherein the ratio of hydrogen to carbon monoxide is 2/1 and quite close to the stoichiometric ratio for producing heavy hydrocarbons in the well known Fischer-Tropsch reaction.

Referring now to FIG. 1 for the process flow scheme, methane and steam are pre-mixed in line 10, the methane having been preheated to about 400° F., preferably about 500° F., with steam in line 21a, and enter the fluid bed reactor 12 where, e.g., a 1 wt% nickel on alumina catalyst is maintained in a fluidized state. Condensate is recovered in line 21b. Oxygen is separately injected into reactor 12 through line 11. The overhead product gases in line 13 include hydrogen, carbon monoxide, unconverted methane, some steam and lesser amounts of carbon dioxide along with catalyst in the form of catalyst particles that have escaped the fluid bed and catalyst fines. Cyclones 14 and 15 trap catalyst particles and some fines and return these to the fluid bed via diplegs 6 and 17. Makeup catalyst, that is, fresh catalyst added to account for catalyst lost as fines, can be added through either one of the diplegs as shown by line 30. The number and placement of cyclones is optional. A primary cyclone may be used along with a secondary and even a tertiary cycle. The cyclones can be placed within the reactor vessel or external to the vessel. These options are not shown and are at the designers discretion. The important point is that regardless of the number or placement of the cyclones, some fines will escape and deposit in line 18 and in the waste heat boiler 19 where boiling water enters through line 20 and leaves as steam through line 21. At least a portion of the steam in line 21 is used in line 21(a) to preheat the hydrocarbon feed. At least about 5% of the team, preferably at least about 10% of the steam is used for preheat purposes. The cooling provided by the boiling water cools the reaction products from about 1800° F. to less than about 1200° F. The cooled gases in line 22 can be further quenched in heat exchanger 23 to about 500°–600° F. and water in the product can be separated in vessel 24 with the synthesis gas product exiting through line 25 and with the condensed water leaving through line 26.

Heat exchange in waste heat boiler 19 is effected by indirect means, a shell and tube heat exchanger where the product gas in on the tube side and the cooling water is on the shell side.

The feed material to be converted to synthesis gas is a light hydrocarbon, for example, a $C_1$–$C_4$ alkane. More preferably, the feed material comprises primarily methane with lesser amounts of $C_2$'s and $C_3$'s and trace amounts of higher alkanes. Any feed gas having a methane concentration in excess of 80% is useful. For example, natural gas which contains about 85% methane, up to about 10% ethane, up to about 3% propane and trace amounts of $C_4$–$C_8$. Condensate in the gas should be removed and contaminants, such as hydrogen sulfide, are removed by known methods.

Steam reforming catalysts are well known and are usually nickel on a support that will be stable at reaction conditions. Alumina is preferred as the support although other refractory oxides such as magnesium oxide or calcium oxide can be used in combination with alumina.

In fluid beds, particles generally range from 30 to 150 microns in size. The primary criteria for particle size distribution involves key fluidization characteristics such as bubble size, fluidization regime, etc.

The mole ratio of methane to steam can range from 1 to 3, and more preferably 1.5 to 2.5. When oxygen is employed, care must be exercised to avoid pre-mixing of oxygen and hydrocarbon prior to the reaction vessel. This can be accomplished by separately injecting the oxygen as shown in FIG. 1.

The cooling step can be conducted in the manner illustrated as long as the cooling rate is at least 300° F./second, preferably at least 400° F./second until the temperature in the product gases is below about 1200° F., preferably below about 900° F. The rate of cooling is such that steam production is at least about two thousand pounds per million standard cubic feet per day of hydrocarbon feed. Preferably, steam production is at least about 2500 pounds per MM SCFD of feed.

EXAMPLE

An example of this invention was demonstrated in a fluid bed reactor containing a catalyst operating at 1800° F. and 360 psia. The feed gas was a mixture of $CH_4/H_2O/O_2$ with a mole ratio of 1.0/0.5/0.5, respectively. The synthesis gas leaving the reactor was essentially at equilibrium and had the following composition:

|  | Mole % |
|---|---|
| $CH_4$ | 2.72 |
| $H_2$ | 55.78 |
| $CO$ | 23.71 |
| $CO_2$ | 3.69 |
| $H_2O$ | 14.10 |
|  | 100.00 |

Figure 2:
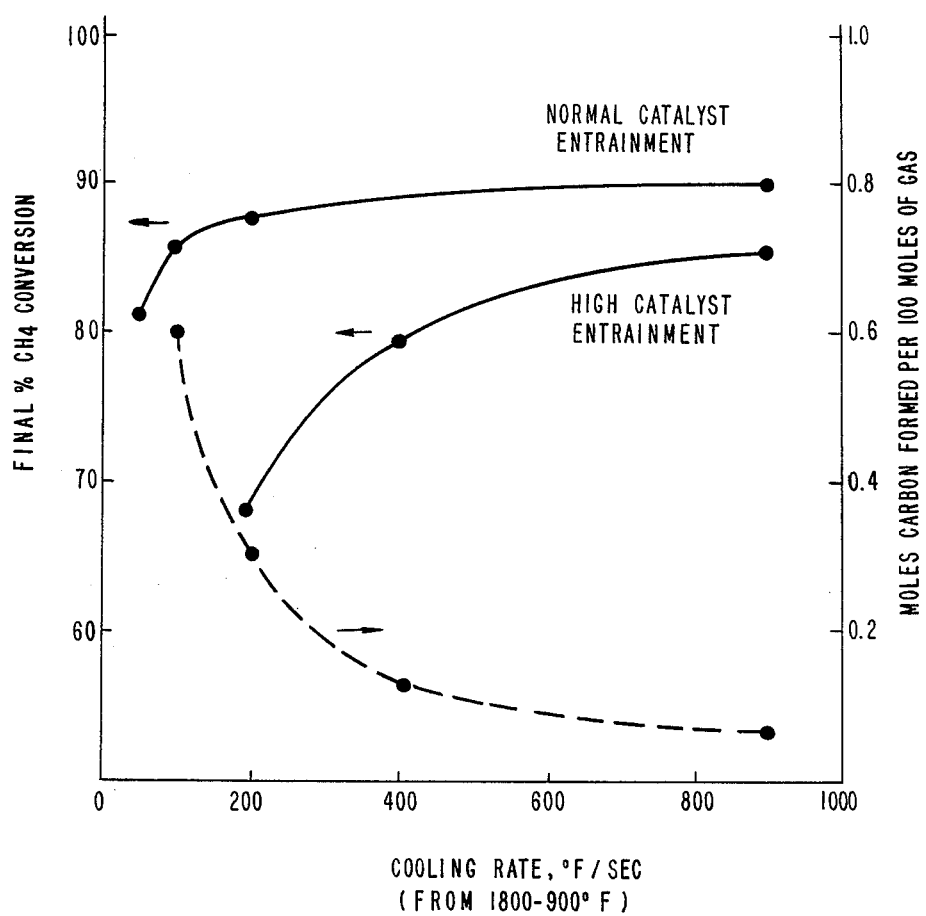
FIG. 2 is a plot of methane and carbon formed in the cooling zone at different cooling rates.

The cooling of the synthesis gas was conducted at different cooling rates and the results of these tests are shown in FIG. 2. Smooth operability of the cool-down equipment is achieved with carbon formation below about .002 moles carbon per mole of gas. This requires a cooling rate of greater than 300° F./second in cooling the gas from 1800° F. to 900° F. For a normal catalyst entrainment rate (.0015 cc catalyst/cc gas) the final $CH_4$ conversion is 87.8% for a cooling rate of 200° F./second. This conversion level is slightly lower than the $CH_4$ conversion level of 90% which was the level achieved in the fluid bed reactor. For an operation that leads to a high catalyst entrainment rate of about 0.015 cc catalyst/cc gas, a 200° F./second cooling rate of the synthesis gas results in the loss of $CH_4$ conversion from 90% to about 68%. For the operation with the higher entrainment rate, a more rapid cool-down is required, preferably a rate above 400° F./second in order to preserve the $CH_4$ conversion. This would prevent the $CH_4$ conversion from decreasing below 80% conversion.

What is claimed is:

1. In a process for the production of a hydrogen and carbon monoxide containing synthesis gas which comprises
    (i) reacting in a fluidized reaction zone a light hydrocarbon feed with steam and oxygen at elevated temperature in the presence of catalyst containing nickel on a support,
    (ii) recovering a product gas comprised of carbon monoxide, hydrogen and entrained catalyst, and
    (iii) cooling in a cooling zone the product gas to a temperature below that which favors the reaction of carbon monoxide and hydrogen to form methane in the presence of entrained catalyst;

THE IMPROVEMENT WHICH COMPRISES
    (a) cooling the product gas rapidly by indirect means with boiling water forming high pressure steam and at a rate sufficient to preserve at least about 85% of the feed converted to hydrogen and carbon monoxide as hydrogen and carbon monoxide;
    (b) recovering high pressure steam from the cooling zone; and
    (c) preheating the light hydrocarbon feed with at least a portion of the steam recovered from the cooling zone.

2. The process of claim 1 wherein cooling is effected at a rate of at least about 300° F./second until the temperature of the product gas is less than about 1200° F.

3. The process of claim 1 wherein the temperature in the reaction zone is at least about 1750° F.

4. The process of claim 1 wherein at least 5% of the recovered steam is used for preheating the feed.

5. A process for the production of hydrogen and carbon monoxide which comprises
    (i) reacting in a fluidized reaction zone a light hydrocarbon feed with steam and oxygen at elevated temperatures in the presence of a catalyst containing nickel on a support;
    (ii) recovering from the reaction zone a product gas comprising hydrogen, carbon monoxide, and entrained catalyst;
    (iii) cooling, by indirect means with boiling water forming high pressure steam in a cooling zone, the product gas at a rate of ar least about 300° F./second thereby minimizing the reaction of carbon monoxide with hydrogen to form methane
    (iv) recovering high pressure steam from the cooling zone;
    (v) preheating the hydrocarbon feed with at least a portion of the steam recovered in step (iv); and
    (vi) maintaining a net conversion of feed to carbon monoxide and hydrogen of at least 80%.

6. The process of claim 5 wherein the temperature in the reaction zone is at least 1750° F.

7. The process of claim 5 wherein the formation of carbon in the cooling zone is less than about 0.2 moles carbon per 100 moles carbon monoxide and hydrogen.

8. The process of claim 5 wherein the cooling is effected at a rate of at least 400° F./second.

9. The process of claim 8 wherein the net conversion of feed to carbon monoxide and hydrogen is at least about 90%.

10. The process of claim 5 wherein cooling is effected to a temperature below about 900° F.

* * * * *